(12) United States Patent
Engolz et al.

(10) Patent No.: US 8,267,793 B2
(45) Date of Patent: Sep. 18, 2012

(54) MULTIPLATFORM GAMING SYSTEM

(75) Inventors: Ofir Engolz, Jerusalem (IL); Eyal Toledano, Kiryat Ata (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 78 days.

(21) Appl. No.: 12/857,681

(22) Filed: Aug. 17, 2010

(65) Prior Publication Data

US 2012/0046108 A1    Feb. 23, 2012

(51) Int. Cl.
*A63F 9/24*    (2006.01)

(52) U.S. Cl. .................... 463/42; 463/1; 463/9; 463/40; 345/158

(58) Field of Classification Search ............... 463/1, 9, 463/40, 42; 345/158
See application file for complete search history.

(56) References Cited

U.S. PATENT DOCUMENTS

| | | | |
|---|---|---|---|
| 6,773,344 B1 * | 8/2004 | Gabai et al. .................. | 463/1 |
| 8,077,156 B2 * | 12/2011 | Mizutani et al. ............. | 345/173 |
| 2004/0038740 A1 * | 2/2004 | Muir .............................. | 463/40 |
| 2008/0242414 A1 | 10/2008 | Rofougaran | |
| 2009/0054124 A1 * | 2/2009 | Robbers et al. ................ | 463/9 |
| 2009/0093290 A1 * | 4/2009 | Lutnick et al. ................ | 463/16 |
| 2009/0239650 A1 * | 9/2009 | Alderucci et al. ............. | 463/25 |
| 2009/0322676 A1 | 12/2009 | Kerr | |
| 2010/0016079 A1 | 1/2010 | Jessop | |
| 2010/0167816 A1 * | 7/2010 | Perlman et al. ................. | 463/30 |
| 2010/0273553 A1 * | 10/2010 | Zalewski ........................ | 463/31 |
| 2011/0105226 A1 * | 5/2011 | Perlman ........................ | 463/30 |
| 2011/0306426 A1 * | 12/2011 | Novak et al. ................... | 463/42 |

FOREIGN PATENT DOCUMENTS

| | | |
|---|---|---|
| GB | 2 430 332 | 3/2007 |
| WO | 2008/084893 | 7/2008 |
| WO | 2008/092233 | 8/2008 |
| WO | 2009/148827 | 12/2009 |

OTHER PUBLICATIONS

European Search report for corresponding EP application—mailed on Apr. 26, 2012.

* cited by examiner

*Primary Examiner* — Pierre Eddy Elisca
*Assistant Examiner* — Shahid Kamal
(74) *Attorney, Agent, or Firm* — Roach Brown McCarthy Gruber, P.C.; Kevin D. McCarthy

(57) ABSTRACT

A multiplatform gaming system comprises in combination: (a) a mobile communication device provided with circuitry suitable to communicate over one or more communication channels; (b) software provided in said mobile device to receive inputs from one or more sensors of the device, and to transmit control data relying on said inputs over a communication channel; and (c) a gaming platform provided with a display, which platform runs software suitable to receive said control data and to control the behavior of a game according to such control data.

1 Claim, 5 Drawing Sheets

MULTIPLATFORM GAMING SYSTEM

FIELD OF THE INVENTION

The present invention relates to gaming systems. More particularly, the invention relates to gaming systems that employ more than one platform and wherein one of the one or more platforms is a mobile communication device.

BACKGROUND OF THE INVENTION

Computerized games which involve the use of mobile communication devices, such as mobile phones, and a large screen, such as a TV screen together on the same platform are beginning to appear in the art. Yet, so far no solution has been provided that enables an interaction between the mobile communication device and additional platforms, such as (but not limited to) a TV, Media center, Blueray or WMG.

One example of existing systems is WeeWheel, which is a mobile application that uses the built-in accelerometer of the mobile device to detect movement and to convert it into a joystick, mouse and/or keyboard signals for a PC, so it is possible to play games by only moving the phone. Additional details of this system can be found in the following URLs:
http://www.persian-forums.com/f81/weewheel-v1-18-s60v3-v5-use-your-mobile-phone-pc-joystick-control-pc-games-32069
http://www.youtube.com/watch?v=iAWuYgD-njY An additional example is US Patent Application 20090322676, which relates to a remote wand for controlling the operations of a media system. The wand may be operative to control the movement of a cursor displayed on screen by the position and orientation at which the wand is held. As the user moves the wand, the on-screen cursor may move. The user may use the wand to control a plurality of operations and applications that may be available from the media system, including for example zoom operations, a keyboard application, an image application, an illustration application, and a media application.

The prior art solutions do not enable the smooth transfer between different communication channels and do not offer a gaming platform that can operate both as an inter-device platform and as a standalone platform. Furthermore, the prior art solutions do not enable running of the game on the mobile device alone. It is therefore an object of the present invention to provide a system that overcomes the above-mentioned drawbacks of the prior art.

It is a further object of the invention to provide a multiplatform system that allows running a game on the mobile device alone, or in cooperation with additional platforms, such as a WiFi-enabled TV.

SUMMARY OF THE INVENTION

The invention relates to a multiplatform gaming system comprising in combination:
(a) a mobile communication device provided with circuitry suitable to communicate over one or more communication channels;
(b) software provided in said mobile device to receive inputs from one or more sensors of the device, and to transmit control data relying on said inputs over a communication channel; and
(c) a gaming platform provided with a display, which platform runs software suitable to receive said control data and to control the behavior of a game according to such control data.

According to an embodiment of the invention the mobile communication device is a mobile phone. According to another embodiment of the invention said one or more sensors are selected from among accelerometers, cameras and microphones.

The invention provides a gaming system wherein the mobile device is suitable to run gaming software representing a synthetic reality essentially the same as run on the gaming platform. In one embodiment of the gaming platform of the invention the mobile communication device is configured to run the gaming software comprising the synthetic reality when no communication channel is available between it and the gaming platform, and to run control software that activates essentially the same gaming software on the gaming platform, when communication is available between them.

In another embodiment of the invention the gaming platform is provided with circuitry suitable to switch the running of the gaming software automatically between the mobile communication device and the gaming platform, according to the availability of the communication channel.

In another embodiment the invention is directed to a gaming system comprising in combination:
(a) a mobile communication device;
(b) software provided in said mobile device to receive inputs from one or more image sensors of the device, and to transmit control data relying on said inputs to a mobile gaming client operated by it; and
(c) a display, which is suitable to display an image comprising one or more markers related to one or more augmented reality image(s) that can be displayed on the display of said mobile device.

DETAILED DESCRIPTION OF THE INVENTION

The invention enables the use of a combined platform, i.e. one or more mobile devices and a second device such as, but not limited to, a TV, Media center, Blueray, or WMG, as an inter-device gaming platform that can be separated into a standalone gaming platform.

Thus, the invention enables a continuing playing platform between different devices and different communication channels and the shifting between different communication channels without having to stop the game.

EXAMPLE

The invention will be illustrated through the following example relating to a specific gaming platform. As will be apparent to the skilled person, the invention is not limited to any specific game or design, which is described hereinafter only for the purpose of illustration. The invention will be further described using a mobile phone as the mobile communication device, it being understood that other mobile devices, such as PDAs or the like can be used instead.

Figure 1:
FIG. 1 shows a mobile device operating as a controller.
Figure 2:
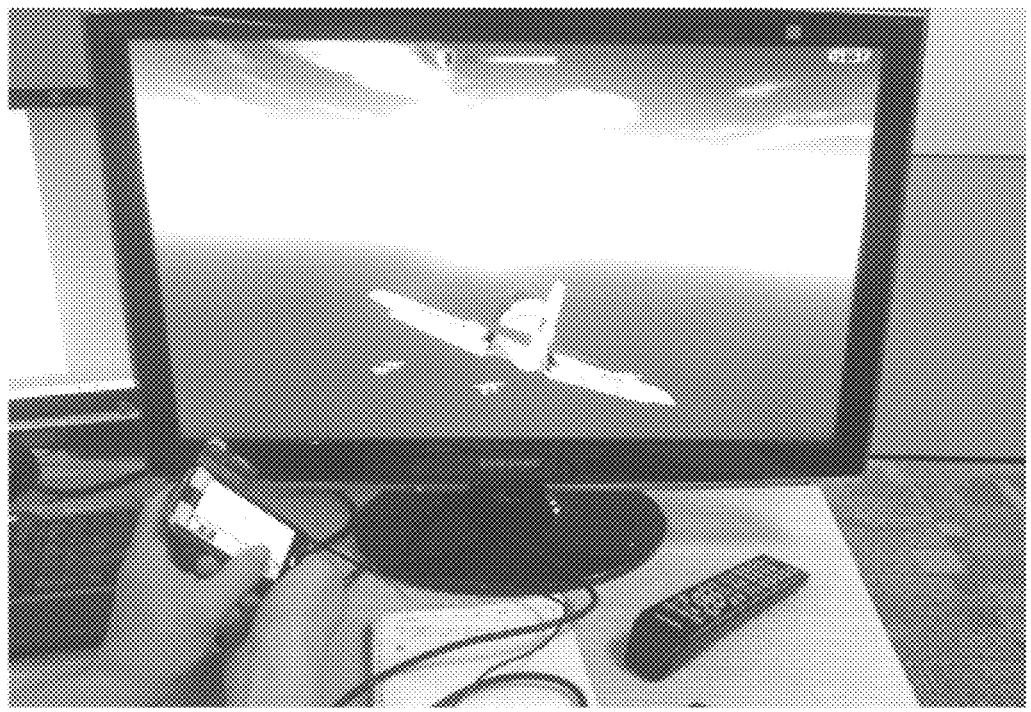
FIG. 2 illustrates the court ruling of an airplane on a large screen using the mobile device in a single player game.
Figure 3:
FIG. 3 shows a game played as a multiplayer platform.

In the exemplary game the mobile device, which in the example is a mobile phone, is used as a controller of an airplane that takes part in the game. A WiFi-enabled TV is used in this example. FIG. 1 shows the mobile phone when used as the controller of the game. In FIG. 2 the TV screen shows the airplane, which is part of the game, flying in a virtual world. The mobile phone displays a radar and cockpit flight controllers. The player uses the mobile phone to navigate in the air and to shoot down targets.

The Controller uses the accelerometer and gyro systems that are imbedded in the mobile phone to simulate the real pitch yaw and roll angles of the plane direction. The user interface allows the user to operate simulated buttons to activate weapons, e.g. to fire guns and release bombs. In this example all data is sent through a specific network protocol via WiFI communication channel to the TV system. The specific protocol is not described herein for the sake of brevity, since it is not essential to the invention because, as will be apparent to the skilled person, different protocols can be devised to carry out the invention. The following is an illustrative and non-limitative example of a suitable protocol.

Client—Server network protocol:
The Server sends the following data package to each client:
Plane Position [X,Y]
Plane Orientation [X,Y]
# of Ships alive
Plane Power up
# of Plane Shields
# of Plane explosive Bullets
# of Plane health
# of Plane Bombs
Player score
Opponents score—Will be 0 if it is a single player game.

This data package will be referred to hereinafter as "STATUS Message".

The Client sends the following data package to the Server
Gyro/Accelerometer Event parameters [x,y]
Weapon shot type The Server calculates, according to the client data, the position, collision, score, health etc.

The application running on the TV, which as described above can also alternatively be applied to other platforms such as (WMG, BlueRay, etc), receives the navigation and play command from the mobile phone via WiFi, and changes the airplane direction on the screen.

The game can be played as a single player game or as a multi-player game. The TV can communicate with several players through the network protocol. The Server protocol can be the same for multi-player and single player, and therefore the Server protocol detailed above is used for this example, i.e.:
For each client: Send STATUS Message.
If it is only a single player game than the opponent score is 0. Thus the communication protocol on the Server's side is the same for both cases.

As stated, the game takes advantage of features available in the mobile phone, such as accelerometer, camera, microphone, gyro and more, to enable both visual and maneuvering control of the element played, which in the example is the control of the airplane.

In this example the server application running on the TV sends to the client application running on the mobile device, a datagram containing the status of enemies, rewards location, health and shield status as described in the "Server-Client network protocol" above.

The touch screen of the mobile phone shows the controlling buttons, and the player activates the different features through a simple button press on the touch screen. When the player leaves the WIFI/TV area, he can continue to play the game on his mobile phone as a stand-alone platform. In this situation the world simulated before on the TV will now appear on the mobile device screen.

In order to switch from single/multi player mode to Stand-Alone mode, the following is performed:
On the Client side: Stop sending datagram to server.
On the Server side: The Server is disabled—no communication takes place.

Similarly, if the user plays the game as a stand-alone application on its mobile device and while playing connects to the TV, the game switches to multi-platform game.

In order to switch from stand alone mode to single/multi-player mode the following is performed:
On the Client side: Send IP to the server for "hand-shake" connection.
On the Server side: Create a communication channel and Send a STATUS Message to the client.

Augmented Reality Game

The invention also enables the playing of augmented reality games. In this scenario, a static image is displayed on a stand-alone display device (i.e. a TV to which the image can be transmitted using the DLNA standard). According to this embodiment of the invention the images viewed on the mobile device are reality-augmented images, relative to the images viewed on the stand-alone display device.

Figure 4A:
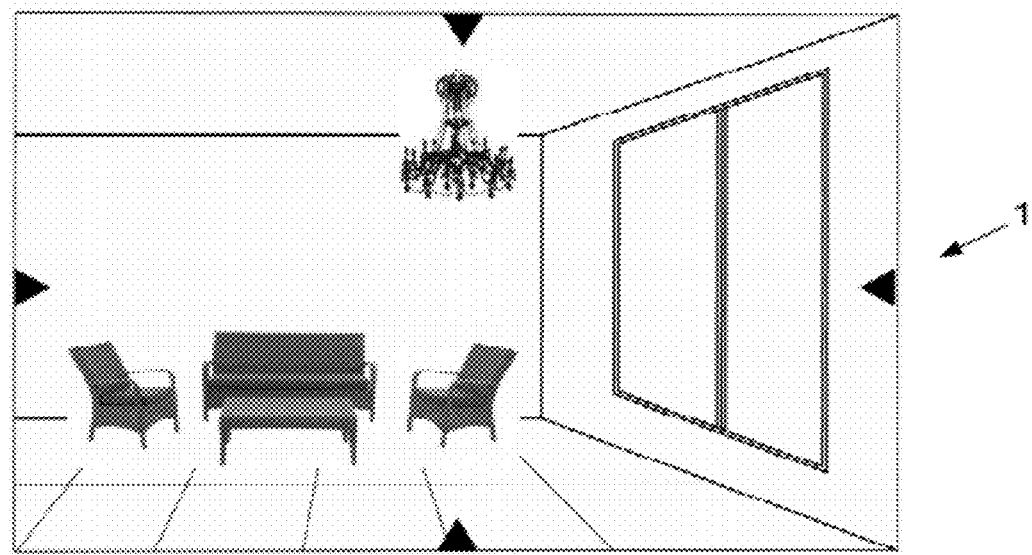
FIGS. 4 (A and B) and 5 illustrate an augmented reality game.
Figure 4B:
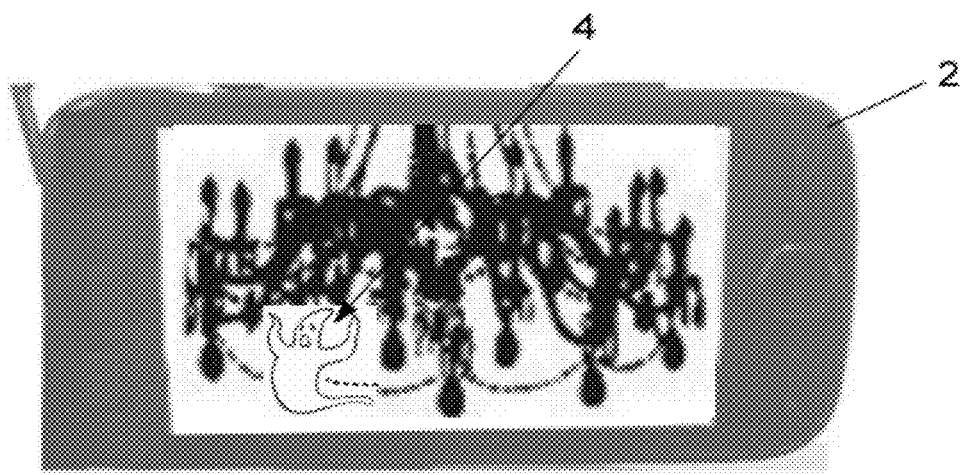

An example of this alternative embodiment is shown in FIG. 4. FIG. 4A shows a TV screen 1 displaying a static image, and FIG. 4B shows the image as seen on a mobile device 2.

Figure 5:
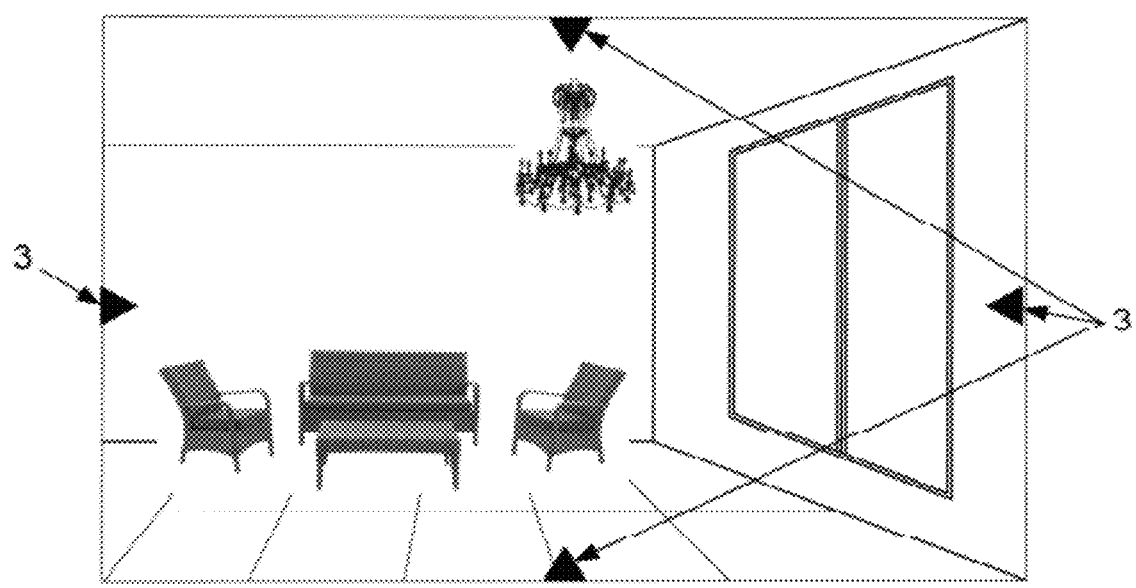

The image shown on the stand-alone display device 1 (in this case, a TV set) consists of special markers (Red/Blue triangles, collectively shown in FIG. 5 as numeral 3). The mobile device that operates the mobile client uses its camera to acquire the image displayed on the TV screen and recognizes the markers via image processing. The markers 3 "tell" the client to which part of the image on the TV screen the user is pointing at.

The user can then see 3D game elements (i.e. in this example "ghosts" 4—FIG. 4B) on his mobile controller, as illustrated in FIG. 4. Those elements are not seen on the TV screen 1 (since it displays a static image).

The mobile client application recognizes the "location" the user is looking at (according to the markers 3 as explained above). It then un-hides 3D elements (i.e. ghosts 4) and displays them on the screen of the mobile device. The mobile client application holds data regarding the position and status of all entities (i.e. ghosts) of the game and displays the relevant entities according to the location/position of the game. In this manner the user is introduced to the 3D world containing the 3D entities. The user's position in the 3D world is defined by the target acquired from the image obtained by mobile device's camera.

Finding the 3D position protocol:
1. Obtain image from mobile device camera.
2. Process the 2D image, and find a "target point" according to red/blue markers.
3. Convert a 2D point to a 3D position in the 3D world.
4. Display 3D elements in the 3D world, relative to the user's 3D location.

All the above description and example have been provided for the purpose of illustration and are not intended to limit the invention in any way. As will be apparent to the skilled person that is no limitation to the type of game that can be used or to the type of platform that can be coupled with the mobile communication device, and any such alternatives are intended to form part of the present invention.

The invention claimed is:

1. A gaming system comprising in combination:
   (a) a mobile communication device comprising one or more image sensors, an image processor, a short range transceiver, a gaming client, and a display on which a game is displayable by means of said gaming client;
   (b) software provided in said mobile device to receive inputs from said one or more image sensors, and to transmit control data relying on said inputs to said gaming client; and
   (c) a stand-alone electronic device comprising a display a short range transceiver, and an image processor,
   wherein the image processor of said mobile device is operable to generate a pixel map representative of an image frame captured by said one or more sensors from a portion of an image displayed on the display of said stand-alone device, said pixel map being transmittable to said stand-alone device via the short range transceiver thereof,
   wherein the image processor of said stand-alone device is operable to generate, from said transmitted pixel map, one or more markers visible on the display of said stand-alone device, each of which being indicative of a corresponding border region of said captured image frame, to assist in aiming said mobile device,
   wherein the image processor of said mobile device is operable to generate one or more augmented reality images which are displayable on the display of said mobile device, said one or more augmented reality images being related to said image portion captured by said one or more sensors;
   wherein the gaming client is operable to (a) store position and status data of three dimensional elements for generating the one or more augmented reality images that are displayable on the display of the mobile device in response to predetermined events of the game and (b) coordinate a three dimensional frame of reference of each of the elements with a two dimensional frame of reference of the captured image.

* * * * *